July 29, 1930. E. F. MILLER 1,771,720
VALVE OPERATING MECHANISM
Filed Aug. 1, 1928
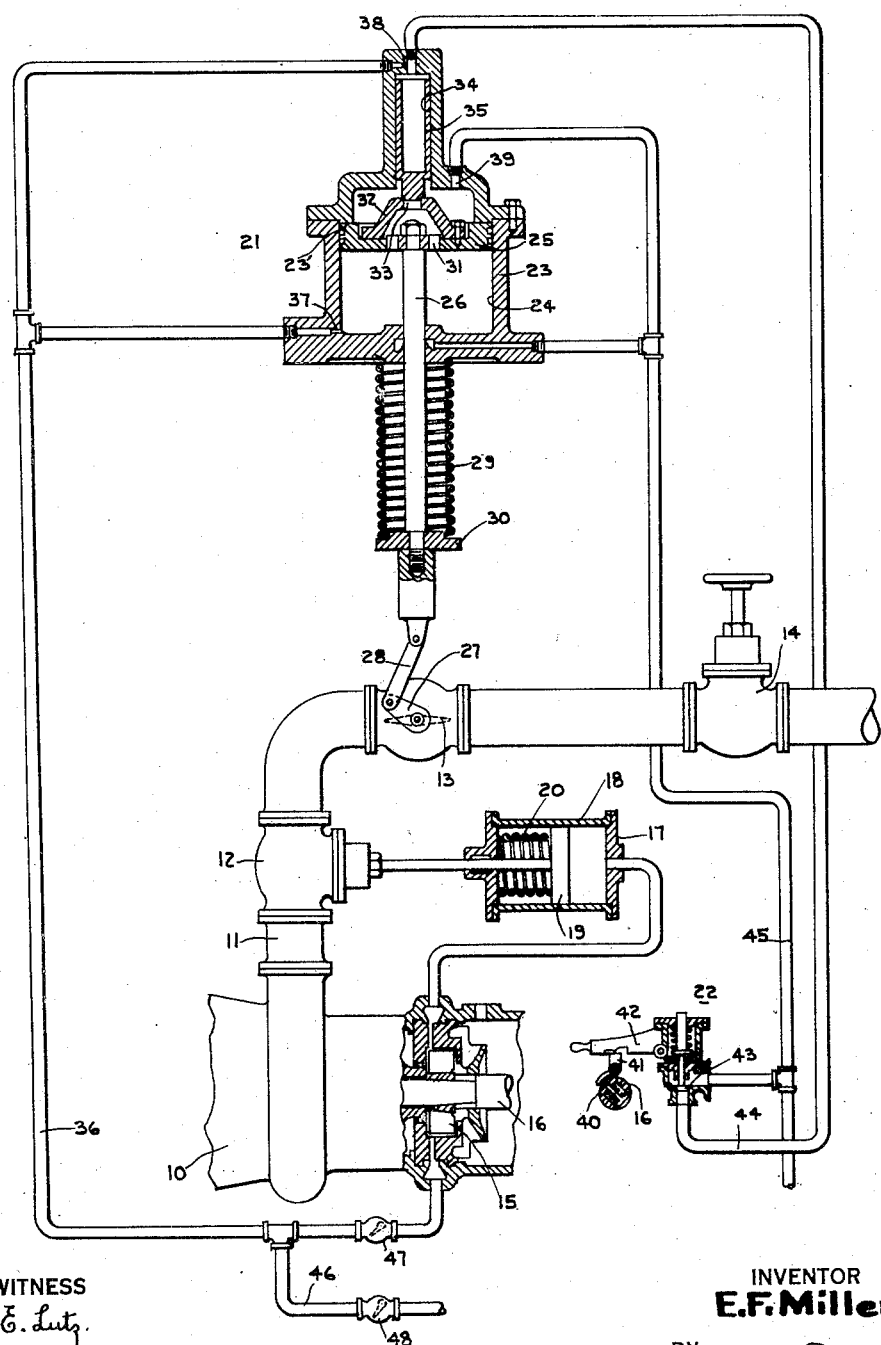
WITNESS
E. Lutz
INVENTOR
E. F. Miller
BY a. B. Reavis
ATTORNEY Patented July 29, 1930

1,771,720

UNITED STATES PATENT OFFICE

ERNEST F. MILLER, OF MOORES, PENNSYLVANIA, ASSIGNOR TO WESTINGHOUSE ELECTRIC & MANUFACTURING COMPANY, A CORPORATION OF PENNSYLVANIA

VALVE-OPERATING MECHANISM

Application filed August 1, 1928. Serial No. 296,831.

My invention relates to a valve operating mechanism, particularly to a mechanism controlled by an automatic stop governor and operating a low-pressure butterfly stop valve, and it has for its object to provide simple, reliable and inexpensive apparatus of the character set forth.

Another object is to provide a valve operating mechanism which is under the complete control of the automatic stop governor.

Another object is to provide a mechanism which will effect rapid and complete closing of the valve upon tripping of the governor and which will fully reopen the valve upon resetting of the governor.

These and other objects are effected by my invention, as will be apparent from the following description and claims taken in connection with the accompanying drawings, forming a part of this application, in which:

The single figure is a diagrammatic view of one embodiment of my invention.

Referring to the drawing more in detail, I show a prime mover 10, which may be a low-pressure steam turbine, supplied with low-pressure steam through a conduit 11. There are interposed in the conduit 11, a governing valve 12, a butterfly stop or throttle valve 13 and a hand operated gate valve 14.

An impeller 15 is mounted on the shaft 16 of the prime mover 10 and provides fluid pressure for supplying the valve operating mechanism, and also, if desired, for governing, said pressure varying as the square of the speed of the shaft.

A fluid pressure governor 17 may be provided for the governing valve 12, said governor consisting of a cylinder 18, a piston 19 disposed therein and connected to the valve 12, and a spring 20 biasing said piston to open the valve. Fluid pressure developed by the impeller 15 is admitted to the cylinder 18 to act on the piston 19 in valve-closing direction.

The operation of this governor is well-known and will be readily apparent. As the speed of the prime mover increases, the impeller pressure increases accordingly and moves the piston 19 to decrease the admission of motive fluid to the prime mover. Upon decrease in speed, the decreased pressure permits the spring 20 to move the valve 12 in opening direction.

The butterfly stop valve 13 is provided in the conduit 11 to effect a rapid and complete cut-off of the supply of motive fluid to the prime mover in case of an abnormal operating condition, such as a 10% overspeed. It is operated by the valve operating mechanism indicated generally at 21, which, in turn, is controlled by the automatic stop governor 22.

The operating mechanism 21 includes a casing 23, providing a cylinder 24, and a piston 25 disposed in the cylinder. A piston rod 26 is secured to the piston, and is connected to the crank lever 27 of the butterfly valve 13 through a connecting rod 28. A spring 29 is interposed between the casing 23 and a collar 30 provided on the piston rod 26, and biases the latter, and consequently also the piston 25 and the butterfly valve 13, in the direction for closing the valve.

The piston 25 is formed with a circular row of openings 31, and an inverted cup-shaped member 32, covering the openings 31 and the end of the piston rod 26, is secured to the piston 25. The member 32 is formed with a central opening 33 forming, together with the openings 31, a passage through the piston for permitting the escape of fluid from the lower end of the cylinder 24 to the upper end.

The cover of the casing 23 is extended to form a cylinder 34, which is of smaller diameter than the cylinder 24, and of slightly greater diameter than the opening 33, the cross-sectional area of the cylinder 34 being thus greater than the area of the opening 33.

Fitting within the cylinder 34 is a valve member 35, having a lower extension of reduced diameter seating on the edge of the opening 33, forming a valve therewith.

It will be noted that the cover of the casing 23 is formed to provide a shoulder 23' against which the piston 25 engages at the upper limit of its travel, as shown on the drawing. It should also be noted that the valve member 35 is not quite at the upper limit of its travel when abutting the piston 25 in this position.

Fluid pressure developed by the impeller is conveyed through a conduit 36 to the cylinders 24 and 34. It is admitted to the lower end of the cylinder 24 through a restricted opening or orifice 37, and to the upper end of the cylinder 34 through a similar orifice 38. The flow of fluid to each cylinder is thus restricted, but the full pressure is obtained in each. The casing 23 is also provided with an outlet or drain opening 39, communicating with the upper end of the cylinder 24 and the lower end of the cylinder 34.

The automatic stop governor 22 includes a weight 40, disposed in a diametrical opening in the shaft 16, and having its center of gravity slightly offset from the axis of the shaft. A bell crank lever 41 has one arm disposed in the path of the weight 40, when the same flies outwardly, and another arm engaging one arm of a lever 42. The other end of the lever 42 engages a valve 43 and normally holds the same in closed position. The valve 43 communicates with the upper end of the cylinder 34, through the conduit 44, and is adapted to release the fluid pressure therein to the drain conduit 45.

Fluid pressure may be supplied to the conduit 36 through a conduit 46 from an auxiliary source, when the impeller 15 does not develop pressure, as when starting. Check valves 47 and 48 are provided in the conduits 36 and 46 to prevent the loss of fluid pressure to the other source when not supplying pressure.

The operation of the above described embodiment is as follows:

Assume the prime mover to be stopped and that it is desired to start the same. The valve 14 is in closed position and the valve 12 is held fully opened by the spring 20. As there is no fluid pressure supplied to the valve operating mechanism 21, the butterfly valve 13 is held closed by the spring 29, and the piston 25 is held at the lower end of its travel in the cylinder. The automatic stop governor is set as shown on the drawing. Fluid pressure is supplied from the auxiliary source, through the conduit 46, and is conveyed through the conduit 36 and the orifices 37 and 38 to the cylinders 24 and 34. The valve member 35 is thereupon moved downwardly to abut the piston 25 and to close the opening 33, if it has not already dropped to such position by gravity.

The valve member 35, when brought to closing position, is biased downwardly by the fluid pressure in the cylinder 34 and upwardly by the pressure in the cylinder 24. However, as the diameter of the cylinder 34 is greater than the diameter of the opening 33, the valve member is held against the piston to close the opening. The fluid under pressure flowing into the cylinder 24 then raises the piston 25 against the force of the spring 29, and also against the fluid pressure in the smaller cylinder 34, until the piston 25 engages the shoulder 23' as shown.

The gate valve 14 may now be opened by hand to start the prime mover, and the governor 17 will come into operation to govern the valve 12 as the prime mover comes up to speed.

Assume now, that the speed of the prime mover exceeds the overspeed for which the automatic stop governor is set. The weight 40 flies outwardly and strikes the adjacent arm of the bell crank lever 41, whereupon the other arm disengages the lever 42. The force holding the valve 43 shut is thus released, and the latter opens under force of the fluid pressure acting thereagainst. The pressure in the cylinder 34 is thus released.

The restricted flow of fluid into the cylinder 34 continues, but readily escapes through the conduit 44 and the valve 43. The pressure in the conduit 36 is substantially unaffected by this flow, inasmuch as the amount thereof is restricted by the orifice 38.

The fluid pressure beneath the piston 25 and the valve member 35 immediately raises the latter upon release of pressure in the cylinder 34. The opening 33 is thus uncovered and the fluid beneath the piston 25 readily escapes therethrough, the piston being moved downwardly by the spring 29 in closing the butterfly valve.

To reopen the butterfly valve, it is only necessary to reset the automatic stop governor, closing the valve 43. The pressure in the cylinder 34 is then restored, and the operating mechanism again opens the butterfly valve in the same manner as when starting, as described above.

It will thus be seen that I have provided a simple valve operating mechanism, particularly suitable for operating a large low-pressure butterfly valve. The operating mechanism is controlled by the automatic stop governor and automatically opens the valve upon setting the governor. Closing the butterfly valve thus does not depend upon a high pressure oil supply or steam supply, the spring 29 replacing the above.

It is pointed out that the drawing is diagrammatic and is not intended to show the correct relative sizes of the various mechanisms. The valve operating mechanism 21, for example, is drawn to a larger scale to show the details thereof more clearly.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are

What I claim is:

1. In an operating mechanism, the combination of a cylinder, a piston therein, means biasing the piston in one direction, means for applying fluid pressure to said piston to bias the same in the opposite direction, a valve member adapted to release said fluid pressure, said valve member being biased in opening direction by said fluid pressure and in closing direction by the same pressure of fluid applied over a greater area, and means for releasing the fluid pressure acting on said last mentioned area.

2. In a valve-operating mechanism, the combination of a cylinder, a piston therein for operating the valve, means biasing the piston in valve closing direction, means applying fluid pressure to said piston to bias the same in valve-opening direction, a valve member adapted to release said fluid pressure, said valve member being biased in opening direction by said fluid pressure and in closing direction by the same pressure of fluid applied over a greater area, and means for releasing the fluid pressure acting on said last-mentioned area.

3. In a fluid-actuated operating mechanism, the combination of a cylinder, an operating piston therein, means for admitting a restricted flow of fluid under pressure to said cylinder on one side of said piston, means biasing said piston in opposition to said fluid pressure, means providing a passage between the spaces in said cylinder on opposite sides of said piston, a valve member adapted to close communication through said passage and being biased in opening direction by said fluid pressure, means for applying a fluid pressure to said valve member which exerts a greater pressure in closing direction, and means for releasing the last-mentioned fluid pressure, whereby said passage permits the escape of the first-mentioned fluid pressure to the opposite side of the piston and the biasing means is effective to control said piston.

4. In an operating mechanism, the combination of a cylinder, an operating piston therein having an opening therethrough, means for supplying fluid under pressure into said cylinder at one side of said piston, fluid outlet means on the other side of said piston, means biasing said piston toward the side of fluid pressure, a valve member adapted to close said opening in the piston upon movement in the direction of said bias and being biased in the opposite direction by said fluid pressure, means for holding said valve member in closing position by fluid pressure, and means for releasing the fluid pressure in said last-named means, whereupon the fluid pressure in said cylinder moves said valve member in opening direction and escapes through the opening in said piston, permitting said first-mentioned bias means to control the piston.

5. In an operating mechanism, the combination of a cylinder, an operating piston therein having an opening therethrough, means for supplying fluid under pressure into said cylinder at one side of said piston, fluid outlet means on the other side of said piston, means biasing said piston toward the side of fluid pressure, a valve member disposed on said other side of the piston and closing said opening by abutment with said piston, means for holding said valve member in abutting engagement with said piston by fluid pressure, and means for releasing the fluid pressure in said last-named means, whereupon the fluid pressure in said cylinder moves said valve member away from said piston and escapes through the opening in said piston, permitting said bias means to control the piston.

6. In an operating mechanism for a valve, the combination of an operating piston connected to said valve, a cylinder for said piston, bias means for closing said valve, means providing a restricted flow of fluid under pressure into said cylinder for moving said piston to open the valve, said piston having an opening therethrough, a valve member movable into abutment with said piston and adapted to close said opening upon abutment therewith, means for applying fluid pressure to said valve member in the direction to abut said piston, and means for releasing said last-mentioned fluid pressure whereupon said fluid under pressure moves said valve member in opening direction and escapes through the opening in the piston, and said bias means becomes effective to close said valve.

7. The combination with a prime mover and a throttle valve therefor, of an operating mechanism for the throttle valve comprising a piston having an opening therethrough and connected to the valve, means biasing said piston to close the valve, a casing providing a cylinder for the piston, means for supplying fluid under pressure to said cylinder on the side of said piston, on which it acts to move the piston in valve-opening direction, said cylinder having fluid outlet means on the other side of said piston, a valve member disposed on said other side of the piston and adapted to close said opening upon movement toward the piston, said valve member being biased in opening direction by said fluid pressure acting thereon through said opening, said casing having a second cylinder for said valve member of smaller diameter than the first-mentioned cylinder but of greater cross-sectional area than the areas subjected to said fluid pressure, means for supplying fluid pressure to said second cylinder to act on said valve member in closing direction, and means for releasing the fluid pressure in said second cylinder upon an abnormal operating condition of said prime mover.

In testimony whereof, I have hereunto subscribed my name this 27th day of July, 1928.

ERNEST F. MILLER.